(12) United States Patent
Liu et al.

(10) Patent No.: US 12,313,563 B1
(45) Date of Patent: May 27, 2025

(54) DARK-FIELD CONFOCAL MICROSCOPY MEASUREMENT APPARATUS BASED ON VORTEX INTERFERENCE

(71) Applicant: Harbin Institute of Technology, Harbin (CN)

(72) Inventors: Jian Liu, Harbin (CN); Chenguang Liu, Harbin (CN); Zijie Hua, Harbin (CN); Xiaoyu You, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 0 days.

(21) Appl. No.: 18/813,669

(22) Filed: Aug. 23, 2024

(30) Foreign Application Priority Data

Jul. 26, 2024 (CN) .......................... 202411010366.7

(51) Int. Cl.
| | |
|---|---|
| *G02B 21/00* | (2006.01) |
| *G01N 21/88* | (2006.01) |
| *G02B 21/06* | (2006.01) |
| *G02B 21/10* | (2006.01) |

(52) U.S. Cl.
CPC ..... *G01N 21/8806* (2013.01); *G02B 21/0032* (2013.01); *G02B 21/10* (2013.01); *G01N 2021/8822* (2013.01)

(58) Field of Classification Search
CPC ....... G01N 21/8806; G01N 2021/8822; G02B 21/0032; G02B 21/10; G02B 21/00; G02B 21/0004; G02B 21/0012; G02B 21/0016; G02B 21/002; G02B 21/0024; G02B 21/0028; G02B 21/0052; G02B 21/0056; G02B 21/06; G02B 21/08; G02B 21/082; G02B 21/084; G02B 21/14
See application file for complete search history.

(56) References Cited

U.S. PATENT DOCUMENTS 7,372,578 B2 * 5/2008 Akiba ................ G01B 11/2441
356/497
10,393,500 B2 * 8/2019 Yamauchi .............. G01N 21/45

FOREIGN PATENT DOCUMENTS

KR 20120001286 A * 1/2012

* cited by examiner

*Primary Examiner* — Thong Q Nguyen
(74) *Attorney, Agent, or Firm* — M&B IP Analysts, LLC.

(57) ABSTRACT

This application relates to optical precision measurement and provides a dark-field confocal microscopy measurement apparatus based on vortex interference. A vortex light generation module is configured to generate vortex light with a predetermined order. A vortex light interference module is configured to: divide the vortex light into reference light and imaging light, direct the imaging light to irradiate a scanning position of a to-be-measured sample, to obtain sample reflection light of the scanning position, and enable the reference light and the sample reflection light to overlap and interfere with each other to obtain interference light. A rotation demodulation module is configured to perform rotation demodulation on the interference light, to obtain amplitude and phase information of the scanning position, so as to characterize the amplitude and phase information of defects and realize detection of phase-type defects.

8 Claims, 1 Drawing Sheet

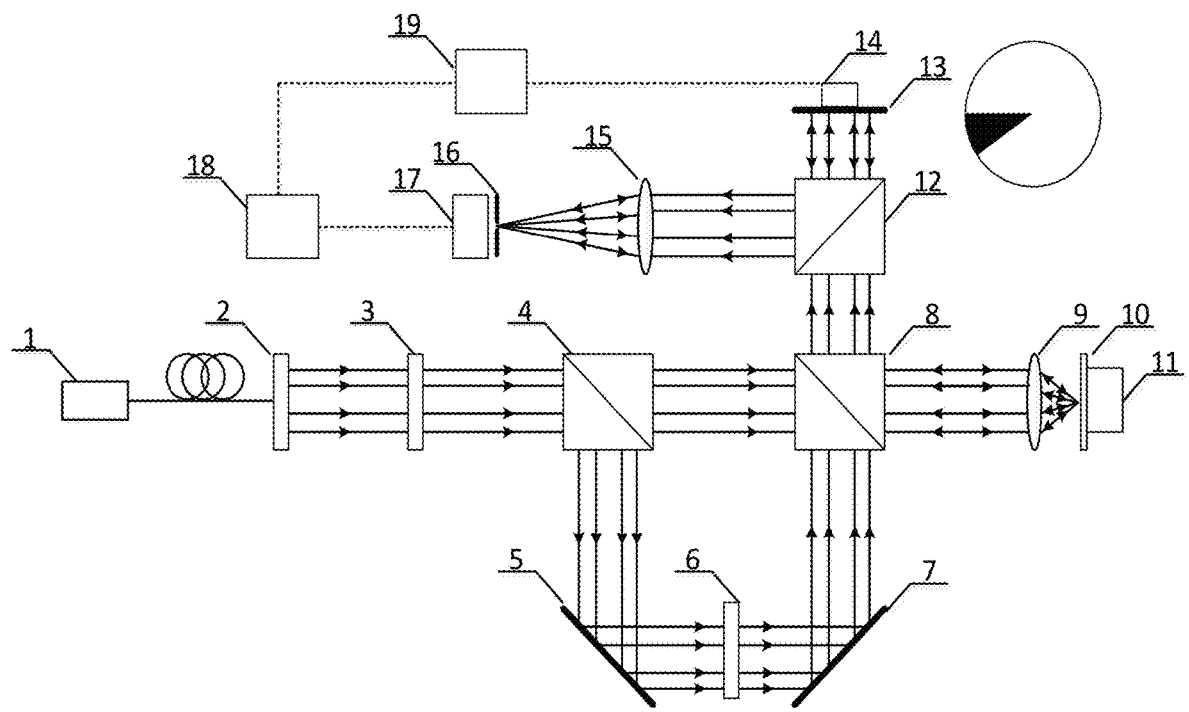

DARK-FIELD CONFOCAL MICROSCOPY MEASUREMENT APPARATUS BASED ON VORTEX INTERFERENCE

CROSS REFERENCE TO RELATED APPLICATION

This patent application claims the benefit and priority of Chinese Patent Application No. 202411010366.7, filed with the China National Intellectual Property Administration on Jul. 26, 2024, the disclosure of which is incorporated by reference herein in its entirety as part of the present application.

TECHNICAL FIELD

This application relates to the technical field of optical precision measurement, and in particular, to a dark-field confocal microscopy measurement apparatus based on vortex interference.

BACKGROUND

Interlayer defects (such as holes and layer faults) in three-dimensional (3D) integrated circuits of semiconductors often degrade the electrical performance and lifespan. Accurate detection of these interlayer defects is crucial for ensuring high product yield in 3D integrated circuits.

Confocal microscopy measurement technology is suitable for non-destructive detection in 3D integrated circuits due to the 3D sectioning capability. The dark-field confocal microscopy measurement technology has become essential for non-destructive defect detection in 3D integrated circuits due to advantages such as excellent optical sectioning capability, high imaging resolution, and strong imaging contrast against a dark background. However, conventional optical dark-field confocal microscopy measurement technology exhibits a low response rate to micro-scale defects and struggles to detect phase-type defects (such as bubbles and layer faults). As a result, obtaining phase information and achieving sufficient accuracy in defect detection is challenging.

SUMMARY

The purpose of this application is to provide a dark-field confocal microscopy measurement apparatus based on vortex interference, to characterize the amplitude and phase information of defects and realize detection of phase-type defects.

To achieve the above objective, this application provides the following technical solutions.

This application provides a dark-field confocal microscopy measurement apparatus based on vortex interference, including:
a vortex light generation module configured to generate vortex light with a predetermined order;
a vortex light interference module configured to divide the vortex light into reference light and imaging light, direct the imaging light to irradiate a scanning position of a to-be-measured sample to obtain sample reflection light of the scanning position, and enable the reference light and the sample reflection light to overlap and interfere with each other to obtain interference light, where the to-be-measured sample is a 3D integrated circuit, the reference light and the sample reflection light have opposite orders, and the interference light has a petal-shaped light spot; and
a rotation demodulation module configured to perform rotation demodulation on the interference light, to obtain amplitude and phase information of the scanning position.

Optionally, the vortex light generation module includes a fiber laser, a fiber collimation beam expander, and a spiral phase plate sequentially arranged in a light propagation direction, and the spiral phase plate is configured to modulate exit light of the fiber collimation beam expander to obtain the vortex light with the predetermined order.

Optionally, the vortex light interference module includes:
a first non-polarizing beam splitter configured to divide the vortex light into the reference light and the imaging light;
a second non-polarizing beam splitter configured to direct the imaging light to be incident on a sample scanning unit, where
the sample scanning unit is configured to direct the imaging light to irradiate the scanning position of the to-be-measured sample, to obtain the sample reflection light of the scanning position, and enable the sample reflection light to be incident on the second non-polarizing beam splitter; and
a reference light processing unit configured to reflect the reference light for a plurality of times, and enable exit light after the reflection for a plurality of times to be incident on the second non-polarizing beam splitter, where
the second non-polarizing beam splitter is further configured to enable the reference light and the sample reflection light to overlap and interfere with each other to obtain the interference light.

Optionally, the sample scanning unit includes an objective lens.

Optionally, the reference light processing unit includes a first reflector, a variable optical attenuator, and a second reflector sequentially arranged in the light propagation direction.

Optionally, the sample scanning unit further includes a 3D displacement platform; the to-be-measured sample is located on the 3D displacement platform; and the 3D displacement platform is configured to drive the to-be-measured sample to move to adjust the scanning position of the to-be-measured sample.

Optionally, the rotation demodulation module includes a signal generator, a chopper driver, a lock-in amplifier, and a third non-polarizing beam splitter, a chopper, a focusing lens, a pinhole, and a photoelectric detector that are sequentially arranged in the light propagation direction;
the signal generator is in signal connection with the chopper driver and the lock-in amplifier separately, and is configured to transmit control signals to the chopper driver and the lock-in amplifier;
the chopper driver is configured to drive a chopper to rotate based on the control signal, and the chopper is configured to chop transmission light of the third non-polarizing beam splitter to obtain chopped light; and
the lock-in amplifier is in signal connection with the photoelectric detector and configured to demodulate an input signal with an electric signal output by the photoelectric detector as the input signal and the control signal as the reference signal, to obtain the amplitude and phase information of the scanning position.

Optionally, a phase distribution is loaded on the spiral phase plate, and the phase distribution is as follows:

exp(imφ).

i is an imaginary unit, m is a predetermined order, and φ is a planar angular coordinate of the spiral phase plate.

Optionally, the chopper driver is a rotating motor.

According to specific embodiments provided in this application, this application discloses the following technical effects:

This application provides a dark-field confocal microscopy measurement apparatus based on vortex interference. A vortex light generation module is configured to generate vortex light with a predetermined order. A vortex light interference module is configured to: divide the vortex light into reference light and imaging light, direct the imaging light to irradiate a scanning position of a to-be-measured sample, to obtain sample reflection light of the scanning position, and enable the reference light and the sample reflection light to overlap and interfere with each other to obtain interference light, where the interference light has a petal-shaped light spot. A rotation demodulation module is configured to perform rotation demodulation on the interference light, to obtain amplitude and phase information of the scanning position. When there is a defect in the scanning position, amplitude modulation and phase modulation are performed on the imaging light. The phase modulation causes the symmetry axis of the interference light with the petal-shaped light spot to rotate, and the amplitude modulation changes the relative intensity between light and dark areas of the interference light with the petal-shaped light spot. Subsequently, the rotation demodulation module performs demodulation, thereby detecting both the amplitude (absorption) and phase (height and refractive index) of the defect simultaneously. This allows characterization of the amplitude and phase information of the defects, realizing detection of phase-type defects.

BRIEF DESCRIPTION OF THE DRAWINGS

To describe the technical solutions in the examples of this application or in the prior art more clearly, the following briefly describes the accompanying drawings required for the examples. Apparently, the accompanying drawings in the following description show merely some examples of this application, and a person of ordinary skill in the art may still derive other accompanying drawings from these accompanying drawings without creative efforts.

FIG. 1 is schematic structural diagram of a dark-field confocal microscopy measurement apparatus based on vortex interference according to Embodiment 1 of this application.

REFERENCE NUMERALS

1—fiber laser; 2—fiber collimation beam expander; 3—spiral phase plate; 4—first non-polarizing beam splitter; 5—first reflector; 6—variable optical attenuator; 7—second reflector; 8—second non-polarizing beam splitter; 9—objective lens; 10—to-be-measured sample; 11—3D displacement platform; 12—third non-polarizing beam splitter; 13—chopper; 14—chopper driver; 15—focusing lens; 16—pinhole; 17—photoelectric detector; 18—lock-in amplifier; and 19—signal generator.

DETAILED DESCRIPTION OF THE EMBODIMENTS

The technical solutions in embodiments of the present application are described below clearly and completely with reference to the drawings in the embodiments of the present application. Apparently, the described embodiments are merely part rather than all of the embodiments of the present application. All other embodiments obtained by those of ordinary skill in the art based on the embodiments of the present application without creative efforts should fall within the protection scope of the present application.

Embodiment 1

This application provides a dark-field confocal microscopy measurement apparatus based on vortex interference. As shown in FIG. 1, the dark-field confocal microscopy measurement apparatus includes:

A vortex light generation module is configured to generate vortex light with a predetermined order.

A vortex light interference module is configured to divide the vortex light into reference light and imaging light, direct the imaging light to irradiate a scanning position of a to-be-measured sample 10 to obtain sample reflection light of the scanning position, and enable the reference light and the sample reflection light to overlap and interfere with each other to obtain interference light. The to-be-measured sample 10 is a 3D integrated circuit, the reference light and the sample reflection light have opposite orders, and the interference light has a petal-shaped light spot.

A rotation demodulation module is configured to perform rotation demodulation on the interference light, to obtain amplitude and phase information of the scanning position.

In this embodiment, the vortex light generation module is configured to generate the vortex light with the predetermined order. The vortex light is subsequently used to illuminate the to-be-measured sample 10, so it can be called vortex illumination light.

Specifically, the vortex light generation module includes a fiber laser 1, a fiber collimation beam expander 2, and a spiral phase plate 3 sequentially arranged in a light propagation direction.

The fiber laser 1 is configured to output coherent laser light in the visible light spectrum. In other words, the wavelength of the laser light output by the fiber laser 1 falls within the visible light spectrum.

The fiber collimation beam expander 2 is configured to collimate and expand the coherent laser light output by the fiber laser 1, to generate parallel light.

The spiral phase plate 3 is configured to modulate exit light (that is, parallel light) of the fiber collimation beam expander 2, to obtain the vortex light with the predetermined order.

The wavelength of the spiral phase plate 3 is designed to match the wavelength of the coherent laser light output by the fiber laser 1, and a phase distribution is loaded on the spiral phase plate 3, such that the spiral phase plate 3 modulates the parallel light and outputs the vortex light with a single fixed order. For example, the order m of the vortex light may be 1, 2, 3, 4, or 5. The phase distribution loaded on the spiral phase plate 3 is as follows:

exp(imφ).

i is an imaginary unit, and i=$\sqrt{-1}$; m is a predetermined order, which is an integer ranging between 1 and 5; and φ is a planar angular coordinate of the spiral phase plate 3.

Based on the above structure of the vortex light generation module, the fiber laser 1 outputs the coherent laser light in the visible light spectrum, and the coherent laser light is incident on the fiber collimation beam expander 2. The fiber collimation beam expander 2 generates the parallel light, and the parallel light is incident on the spiral phase plate 3. The spiral phase plate 3 outputs the vortex light.

In this embodiment, the vortex light interference module is configured to: divide the vortex light into the reference light and the imaging light, direct the imaging light to irradiate the scanning position of the to-be-measured sample 10 to obtain the sample reflection light of the scanning position, and enable the reference light and the sample reflection light to overlap and interfere with each other to obtain the interference light. The interference light has a petal-shaped light spot.

Specifically, the reference light and the imaging light are generated through beam splitting, and the imaging light is focused on the scanning position of the to-be-measured sample 10 to scan the scanning position of the to-be-measured sample 10 and obtain the sample reflection light. The difference in the number of reflections in the optical path of the reference light and the sample reflection light causes opposite orders of the reference light and the sample reflection light, such that the reference light and the sample reflection light overlap and interfere with each other. The petal-shaped interference light is thus generated. The vortex light interference module includes:

A first non-polarizing beam splitter 4 is configured to divide the vortex light into the reference light and the imaging light. Specifically, beam splitting is performed on the vortex light to obtain reflection light and transmission light. The reflection light is the reference light, and the transmission light is the imaging light.

A second non-polarizing beam splitter 8 is configured to direct the imaging light to be incident on a sample scanning unit, specifically, to transmit the imaging light to the sample scanning unit.

The sample scanning unit, also known as a vortex illumination confocal unit, is configured to direct the imaging light to irradiate the scanning position of the to-be-measured sample 10, to obtain the sample reflection light of the scanning position, and enable the sample reflection light to be incident on the second non-polarizing beam splitter 8. The sample reflection light contains information about the to-be-measured sample 10 and a defect, and therefore can be referred to as signal return light.

The sample scanning unit includes an objective lens 9 configured to focus the imaging light to the scanning position of the to-be-measured sample 10, such that the imaging light irradiates the scanning position of the to-be-measured sample 10, to obtain the sample reflection light of the scanning position. The sample reflection light passes through the objective lens 9 and is incident on the second non-polarizing beam splitter 8.

A reference light processing unit is configured to reflect the reference light for a plurality of times, and enable exit light after the reflection for a plurality of times to be incident on the second non-polarizing beam splitter 8.

The reference light processing unit includes a first reflector 5, a variable optical attenuator 6, and a second reflector 7 sequentially arranged in the light propagation direction. The first reflector 5 is configured to reflect the reference light to the variable optical attenuator 6, the variable optical attenuator 6 is configured to adjust the intensity of the light reflected by the first reflector 5, such that the intensity of the reference light is the same as that of the sample reflection light. The second reflector 7 is configured to reflect the exit light of the variable optical attenuator 6 to the second non-polarizing beam splitter 8.

The second non-polarizing beam splitter 8 is further configured to enable the reference light and the sample reflection light to overlap and interfere with each other, to obtain interference light. Specifically, the second non-polarizing beam splitter 8 is configured to split the reference light and the sample reflection light, to enable transmission light of the reference light and reflection light of the sample reflection light to overlap and interfere with each other, to obtain the interference light.

Based on the above structure of the vortex light interference module, the vortex light is divided into two beams by the first non-polarizing beam splitter 4. The reflection light enters the reference path and the transmission light enters the imaging path. To be specific, the first non-polarizing beam splitter 4 divides the optical path into two paths: the reflection light path and the transmission light path. The reflection light path is the reference path, and the transmission light path is the imaging path. The reference path includes a reference light processing unit, and the imaging path includes the second non-polarizing beam splitter 8 and the sample scanning unit.

The vortex light in the reference path is reflected by the first non-polarizing beam splitter 4 to the first reflector 5, reflected by the first reflector 5 to the variable optical attenuator 6, adjusted in light intensity by the variable optical attenuator 6, incident on the second reflector 7, reflected by the second reflector 7 to the second non-polarizing beam splitter 8, and transmitted to the subsequent optical path by the second non-polarizing beam splitter 8. In other words, the vortex light in the reference path is reflected for three times, that is, reflected by the first non-polarizing beam splitter 4, the first reflector 5, and the second reflector 7. The order of the reference light is changed to −m.

The vortex light in the imaging path passes through the first non-polarizing beam splitter 4 to the second non-polarizing beam splitter 8, passes through the second non-polarizing beam splitter 8 to the objective lens 9, and is focused on the scanning position of the to-be-measured sample 10 through the objective lens 9, to obtain the sample reflection light. The sample reflection light is transmitted to the second non-polarizing beam splitter 8 through the objective lens 9, and is reflected to the subsequent optical path through the second non-polarizing beam splitter 8. The sample reflection light is reflected twice by the to-be-measured sample 10 and the second non-polarizing beam splitter 8. The order of the sample reflection light is still m.

By setting the reference path and the imaging path, the optical path difference between the reference light and the sample reflection light is smaller than the coherent length of the light source, ensuring that the interference light can be generated in the future. In addition, the sample reflection light is collected by the objective lens 9, and then reflected by the second non-polarizing beam splitter 8 to the subsequent optical path. The light intensity of the reference light in the reference path is adjusted by the variable optical attenuator 6 to be the same as that of the sample reflection light in the imaging path, and transmitted to the subsequent optical path by the second non-polarizing beam splitter 8. The two beams (namely, the reference light and the sample reflection light) overlap and interfere with each other in the subsequent optical path, resulting in the petal-shaped light spot with the number of petals being 2|m|.

In order to control the position of the to-be-measured sample 10, the sample scanning unit further includes a 3D displacement platform 11, and the to-be-measured sample 10 is located on the 3D displacement platform 11. The 3D displacement platform 11 is configured to drive the to-be-measured sample 10 to move, so as to adjust the scanning position of the to-be-measured sample 10. In this way, any position of the to-be-measured sample 10 can be scanned.

In this embodiment, the rotation demodulation module is configured to perform rotation demodulation on the interference light, demodulate the optical path difference and the changes of the relative intensity between light and dark areas of two paths of light (that is, the reference light and the sample reflection light) brought by the to-be-measured sample 10, recover the amplitude and phase information of the to-be-measured sample 10, to obtain the amplitude and phase information of the scanning position.

Specifically, the rotation demodulation module includes a signal generator 19, a chopper driver 14, a lock-in amplifier 18, and a third non-polarizing beam splitter 12, a chopper 13, a focusing lens 15, a pinhole 16, and a photoelectric detector 17 that are sequentially arranged in the light propagation direction.

The signal generator 19 is in signal connection with the chopper driver 14 and the lock-in amplifier 18 separately, and is configured to transmit control signals to the chopper driver 14 and the lock-in amplifier 18. The control signal may be a periodic square wave signal or a periodic sine wave signal with frequency f and a duty cycle of 50%, and the control signal may be a microwave signal.

The chopper driver 14 may be a rotating motor, which may be referred to as a chopper-driven rotating motor. The chopper driver 14 is configured to drive the chopper 13 to rotate based on the control signal.

The third non-polarizing beam splitter 12 is configured to split the interference light, to obtain the reflection light and transmission light, and the transmission light is incident on the chopper 13.

The chopper driver 13 is configured to chop the transmission light of the third non-polarizing beam splitter 12 to obtain chopped light. The cross section of the chopper 13 is composed of a plurality of sectors with symmetrical centers, alternating between high and low reflection areas. The high reflection areas reflect beams more strongly than the low reflection areas. The high and low reflection areas are arranged at intervals. The interference light is incident close to the edges of the cross section of the chopper 13 to be completely covered by a specific sector. The chopper 13 is controlled to rotate by the rotating motor based on the control signal of the signal generator 19, ensuring a chopping frequency f. The interference light generated after interference is transmitted by the third non-polarizing beam splitter 12 and then chopped by the chopper 13 to obtain the chopped light.

The chopped light is incident on the third non-polarizing beam splitter 12, the third non-polarizing beam splitter 12 is configured to split the chopped light to obtain the reflection light and transmission light, and the reflection light enters the focusing lens 15.

The focusing lens 15 is configured to focus the reflection light from the third non-polarizing beam splitter 12, to obtain the focused light, and the focused light is incident on the pinhole 16.

The pinhole 16 is configured to direct the focused light to be incident on the photoelectric detector 17.

The photoelectric detector 17 is configured to photoelectrically convert the light exiting from the pinhole 16 to obtain an electric signal.

The lock-in amplifier 18 is in signal connection with the photoelectric detector 17. The lock-in amplifier 18 is configured to demodulate the input signal with the electric signal output by the photoelectric detector 17 as the input signal and the control signal as the reference signal, to obtain the amplitude and phase information of the scanning position. The time constant of the lock-in amplifier 18 is set to be greater than or equal to 2/f.

Based on the above structure of the rotation demodulation module, the interference light is transmitted to the chopper 13 through the third non-polarizing beam splitter 12 and chopped by the chopper 13. The light reflected by the chopper 13 (that is, chopped light) is reflected by the third non-polarizing beam splitter 12, and focused by the focusing lens 15 to the pinhole 16. The light intensity is recorded by the photoelectric detector 17. The electric signal output by the photoelectric detector 17 is input to the lock-in amplifier 18 as the input signal, and the control signal of the signal generator 19 is input to the lock-in amplifier 18 as the reference signal. The lock-in amplifier 18 demodulates and records the amplitude and phase of the input signal at the frequency of f.

This embodiment provides a dark-field confocal microscopy measurement apparatus based on vortex interference, including a vortex light generation module, a vortex light interference module, and a rotation demodulation module. Petal-shaped light spots are generated through interference between vortex light with opposite orders, enabling effective detection of phase-type defects such as bubbles and layer faults. The system sensitivity is enhanced through lock-in amplification detection, facilitating detection of nano-scale defects.

In this embodiment, the workflow of the dark-field confocal microscopy measurement apparatus based on vortex interference is as follows:

(1) A fiber laser 1 outputs coherent laser light in the visible light spectrum, and the coherent laser light is incident on a fiber collimation beam expander 2. The fiber collimation beam expander 2 generates parallel light to be incident on a spiral phase plate 3, to output vortex light.

(2) The vortex light is divided into two paths by a first non-polarizing beam splitter 4, with a reflection light path as a reference path and a transmission light path as an imaging path. The vortex light in the reference path is reflected by the first non-polarizing beam splitter 4 to a first reflector 5, reflected by the first reflector 5 to a variable optical attenuator 6, adjusted in light intensity by the variable optical attenuator 6, incident on the second reflector 7, reflected by the second reflector 7 to a second non-polarizing beam splitter 8, and transmitted to a subsequent optical path by the second non-polarizing beam splitter 8. The reference light is reflected for three times, with the order changed to −m. The vortex light in the imaging path passes through the first non-polarizing beam splitter 4 and the second non-polarizing beam splitter 8 to be incident on the objective lens 9, and is focused on a scanning position of a to-be-measured sample 10 through the objective lens 9. Sample reflection light reflected by the scanning position of the to-be-measured sample 10 is collected by the objective lens 9, and is transmitted to and reflected by the second non-polarizing beam splitter 8 to the subsequent path. The sample reflection light is reflected twice with the order being m. The variable optical attenuator 6 adjusts the light intensity of the reference light in the reference path to be the same as that of the sample reflection light in the imaging path, and adjusts the second reflector 7 to enable the two light beams (namely, the reference light and the sample reflection light) to completely overlap in the subsequent optical path, generating the interference light. The 3D displacement platform 11 moves in the 3D direction to perform 3D microscopy measurement on the to-be-measured sample 10.

(3) The position of the chopper 13 is adjusted to enable the interference light close to the edge of the chopper 13 and to be completely covered by a sector area. The signal generator 19 outputs a control signal to control the rotating motor and drive the chopper 13 to rotate at the chopping frequency f. The interference light is transmitted to the chopper 13 through the third non-polarizing beam splitter 12 and chopped by the chopper 13. The chopped light reflected by the chopper 13 is reflected by the third non-polarizing beam splitter 12 to the focusing lens 15, and focused by the focusing lens 15 to the pinhole 16. The light intensity is recorded by the photoelectric detector 17. The signal output by the photoelectric detector 17 is input to the lock-in amplifier 18 as the input signal, and the control signal of the signal generator 19 is input to the lock-in amplifier 18 as the reference signal. The lock-in amplifier 18 demodulates and records the amplitude and phase of the input signal at the frequency f.

In this embodiment, the sample quantitative measurement is realized by the petal-shaped light spot generated by interference between positive and negative-order vortex light, and the symmetrical axis direction of the interference light with the petal-shaped light spot generated after vortex interference is highly sensitive to phase, such that high-sensitivity phase-type defect detection and quantitative phase recovery can be realized, and small intensity and phase changes can be sensed by lock-in amplification detection. In this way, the sensitivity of defect detection can be effectively improved, thereby realizing quantitative phase measurement and high-sensitivity defect detection of samples.

The symmetry axis direction of the interference light with the petal-shaped light spot linearly correlates with the phase difference between the imaging path and the reference path, resulting in high phase sensitivity. When the spatial position (that is, the scanning position) of the focused light spot exhibits defects, amplitude modulation and phase modulation are caused in the imaging light in the imaging path. Phase modulation causes rotation of the symmetry axis of the interference light with the petal-shaped light spot, which is quantitatively recoverable through phase demodulation in lock-in amplification detection. Amplitude modulation changes the relative intensity between light and dark areas of the interference light with the petal-shaped light spot, which can be extracted via amplitude demodulation in lock-in amplification detection. Consequently, defect amplitude (that is, absorptivity) and phase (that is, height and refractive index) can be simultaneously detected, facilitating collection of 3D distribution information on phase-type defects such as nano-scale surface scratches, abrasions, interlayer bubbles, and layer faults.

Following vortex interference, a petal-shaped light spot with a symmetrical center is generated. During chopping by the chopper 13, the intensity of the reflection light undergoes periodic changes. This periodic intensity variation is detected by the lock-in amplifier 18, leveraging the high sensitivity advantage. Compared to the prior art, the high phase sensitivity of vortex interference offers an innovative approach for precise measurement and detection, particularly enhancing sensitivity for interlayer defects in 3D integrated circuits.

Several examples are used herein for illustration of the principles and implementations of this application. The description of the foregoing examples is used to help illustrate the method of this application and the core principles thereof. In addition, those of ordinary skill in the art can make various modifications in terms of specific implementations and scope of application in accordance with the teachings of this application. In conclusion, the content of the present specification shall not be construed as a limitation to this application.

What is claimed is:

1. A dark-field confocal microscopy measurement apparatus based on vortex interference, comprising:
    a vortex light generation module configured to generate vortex light with a predetermined order;
    a vortex light interference module configured to divide the vortex light into reference light and imaging light, direct the imaging light to irradiate a scanning position of a to-be-measured sample to obtain sample reflection light of the scanning position, and enable the reference light and the sample reflection light to overlap and interfere with each other to obtain interference light, wherein the to-be-measured sample is a three-dimensional (3D) integrated circuit, the reference light and the sample reflection light have opposite orders; and
    a rotation demodulation module configured to perform rotation demodulation on the interference light, to obtain amplitude and phase information of the scanning position;
    wherein the vortex light interference module comprises:
    a first non-polarizing beam splitter configured to divide the vortex light into the reference light and the imaging light;
    a second non-polarizing beam splitter configured to direct the imaging light to be incident on a sample scanning unit, wherein
    the sample scanning unit is configured to direct the imaging light to irradiate the scanning position of the to-be-measured sample, to obtain the sample reflection light of the scanning position, and enable the sample reflection light to be incident on the second non-polarizing beam splitter; and
    a reference light processing unit configured to reflect the reference light for a plurality of times, and enable exit light after the reflection for a plurality of times to be incident on the second non-polarizing beam splitter, wherein
    the second non-polarizing beam splitter is further configured to enable the reference light and the sample reflection light to overlap and interfere with each other to obtain the interference light.

2. The dark-field confocal microscopy measurement apparatus based on vortex interference according to claim 1, wherein the vortex light generation module comprises a fiber laser, a fiber collimation beam expander, and a spiral phase plate that are sequentially arranged in a light propagation direction, and the spiral phase plate is configured to modulate exit light of the fiber collimation beam expander to obtain the vortex light with the predetermined order.

3. The dark-field confocal microscopy measurement apparatus based on vortex interference according to claim 2, wherein a phase distribution is loaded on the spiral phase plate, and the phase distribution is as follows:
    exp(imφ), wherein
    i is an imaginary unit, m is the predetermined order, and φ is a planar angular coordinate of the spiral phase plate.

4. The dark-field confocal microscopy measurement apparatus based on vortex interference according to claim 1, wherein the sample scanning unit comprises an objective lens.

5. The dark-field confocal microscopy measurement apparatus based on vortex interference according to claim 1, wherein the reference light processing unit comprises a first reflector, a variable optical attenuator, and a second reflector sequentially arranged in a light propagation direction.

6. The dark-field confocal microscopy measurement apparatus based on vortex interference according to claim 1, wherein the sample scanning unit further comprises a 3D displacement platform; the to-be-measured sample is located on the 3D displacement platform; and the 3D displacement platform is configured to drive the to-be-measured sample to move to adjust the scanning position of the to-be-measured sample.

7. The dark-field confocal microscopy measurement apparatus based on vortex interference according to claim 1, wherein the rotation demodulation module comprises a signal generator, a chopper driver, a lock-in amplifier, and a third non-polarizing beam splitter, a chopper, a focusing lens, a pinhole, and a photoelectric detector that are sequentially arranged in the light propagation direction;

the signal generator is in signal connection with the chopper driver and the lock-in amplifier separately, and is configured to transmit control signal to the chopper driver and the lock-in amplifier;

the chopper driver is configured to drive a chopper to rotate based on the control signal, and the chopper is configured to chop transmission light of the third non-polarizing beam splitter to obtain chopped light; and the lock-in amplifier is in signal connection with the photoelectric detector and configured to demodulate an input signal with an electric signal output by the photoelectric detector as the input signal and the control signal as a reference signal, to obtain the amplitude and phase information of the scanning position.

8. The dark-field confocal microscopy measurement apparatus based on vortex interference according to claim 7, wherein the chopper driver is a rotating motor.

* * * * *